United States Patent [19]

Amos et al.

[11] Patent Number: 4,662,307

[45] Date of Patent: May 5, 1987

[54] METHOD AND APPARATUS FOR RECOATING OPTICAL WAVEGUIDE FIBERS

[75] Inventors: Lynn G. Amos, Wilmington, N.C.; Stuart L. Saikkonen, Elmira, N.Y.; Donald R. Young, Wilmington, N.C.

[73] Assignee: Corning Glass Works, Corning, N.Y.

[21] Appl. No.: 740,106

[22] Filed: May 31, 1985

[51] Int. Cl.$^4$ ............................ C23C 14/08; B05D 3/06
[52] U.S. Cl. .................................. 118/50.1; 118/620; 156/48; 264/275; 427/54.1; 427/140; 427/163
[58] Field of Search ..................... 427/54.1, 163, 140; 118/620, 50.1; 264/275

[56] References Cited

U.S. PATENT DOCUMENTS 4,410,561 10/1983 Hart, Jr. ........................... 427/163 X

OTHER PUBLICATIONS

Hart, A. C. and Krause, J. T., "Coating Technique for High Strength Lightguide Fusion Splices", *Applied Optics*, 22:1731.

*Primary Examiner*—Thurman K. Page
*Attorney, Agent, or Firm*—W. S. Zebrowski; M. M. Klee

[57] ABSTRACT

A split recoating mold for use in recoating optical waveguide fibers with a UV-curable resin is provided wherein: (1) the mold, when closed, forms a cavity for receiving the portion of the fiber which is to be recoated, the cross-sectional size and shape of the cavity being essentially equal to the cross-sectional size and shape of the original fiber; (2) the mold includes an injection port for introducing a UV-curable resin into the cavity; and (3) the mold includes means for introducing ultraviolet light into the cavity so that resin located in regions of the cavity remote from the injection port will cure prior to resin located in regions of the cavity near the injection port.

15 Claims, 4 Drawing Figures 4,662,307

METHOD AND APPARATUS FOR RECOATING OPTICAL WAVEGUIDE FIBERS

BACKGROUND OF THE INVENTION

1. Field of the Invention

This invention relates to optical waveguide fibers and, in particular, to methods and apparatus for recoating portions of such fibers with a UV-curable resin.

2. Description of the Prior Art

As is well known in the art, optical waveguide fibers are normally coated at the time of manufacture with a synthetic resin, e.g., a UV-curable resin, which strengthens and protects the fiber during use. The thickness of this original coating is carefully controlled so as to give the finished fiber uniform transmission, strength and appearance characteristics.

Both during manufacturing and in the field, it is often necessary to join (splice) two pieces of optical waveguide fiber together. As presently practiced, the glass portions of the fiber are fused together first and then the fiber is recoated in the area of the splice. The present invention is directed to the recoating portion of the splicing process, and, in particular, to the problem of recoating the splice so that the diameter of the recoated portion of the fiber matches the diameter of the rest of the fiber.

Various techniques have been used in the past to recoat spliced optical waveguide fibers. One such technique has involved the use of heat shrinkable tubing applied over the splice. Although shrinkable tubing does protect the splice, this approach is far from ideal since it produces a finished fiber having a non-uniform diameter and having two different types of coatings, i.e., the original resin coating and the shrinkable tubing coating.

Another approach has involved potting the splice in a bath of resin and then curing the resin by, for example, exposing it to ultraviolet light. As is evident, this approach does not produce either a uniform fiber diameter or a smooth joint.

A recoating technique employing a split recoating mold, having a transparent upper half made of plastic and a metallic lower half, was reported by A. C. Hart and J. T. Krause in *Applied Optics,* Vol. 22, No. 11, June 1, 1983, pages 1731-1733. In accordance with this technique, the splice which is to be coated, along with coated portions of the fiber on either side of the splice, are centered in a cylindrical groove formed in the mold. UV-curable resin is introduced into the groove using a syringe attached to a port which leads to the groove. After the groove has been filled, the syringe is removed and ultraviolet light is shined through the transparent upper half of the mold to cure the resin. The diameter of the groove is made slightly larger than the original diameter of the fiber to allow air to escape from the mold as the resin is injected into the groove and to compensate for the shrinkage of the resin upon curing.

As with the other prior art techniques, the Hart and Krause technique suffers from various disadvantages. One disadvantage involves the fact that the two halves of the mold have different material compositions, i.e., transparent plastic for the upper half and metal for the lower half. As is known in the art, it is in general easier to machine a material to mate with itself than to machine a material to mate with a different material. Also, the dimensional stability of a mold whose halves have different compositions is likely to be less than the dimensional stability of a mold whose halves have the same composition.

In addition to these problems with the apparatus used by Hart and Krause, the recoated fibers produced by their technique suffer a number of disadvantages. One particularly troublesome problem involves variations in the diameter of the recoated portion of the fiber caused by changes in the amount of resin shrinkage produced by different cure conditions. Also, after being removed from the mold, fibers recoated by the Hart and Krause procedure often include a relatively large flashing in the region of the injection port and, in some cases, include overflow of new resin onto the coated parts of the fiber adjacent to the splice because of the mismatch between the diameter of the mold and the diameter of the fiber.

SUMMARY OF THE INVENTION

In view of the foregoing state of the art, it is an object of the present invention to provide improved methods and apparatus for recoating optical waveguide fibers.

More specifically, it is an object of the present invention to provide improved methods and apparatus for recoating optical waveguide fibers so that the diameter of the recoated portion of the fiber accurately and consistently matches the diameter of the rest of the fiber. It is a further object of the invention to provide improved methods and apparatus for recoating optical waveguide fibers wherein the recoated fiber has a minimum of flashings or other surface imperfections.

It is an additional object of the invention to provide split molds for recoating optical waveguide fibers wherein the two halves of the mold have the same material composition. It is another object of the invention to provide molds for recoating optical waveguide fibers wherein UV-curable resin is introduced into the mold's cavity through a port which is formed in a portion of the mold which is made of a material which is opaque to UV energy. It is a still further object of the invention to provide molds for recoating optical waveguide fibers which are completely made of a material which is opaque to UV energy and yet which provide means for curing UV-curable resins within the mold's cavity.

To achieve the foregoing and other objects, the invention, in accordance with certain of its aspects, provides a split mold for use in recoating fibers with a UV-curable resin wherein: (1) the mold, when closed, forms a cavity for receiving the portion of the fiber which is to be recoated, the cross-sectional size and shape of the cavity being essentially equal to the cross-sectional size and shape of the original fiber; (2) the mold includes an injection port for introducing a UV-curable resin into the cavity; and (3) the mold includes means for introducing ultraviolet light into the cavity so that resin located in regions of the cavity remote from the injection port will cure prior to resin located in regions of the cavity near the injection port.

In certain preferred embodiments of these aspects of the invention, the mold is made of a material, such as metal, which is opaque to ultraviolet light, and the ultraviolet light is introduced into the cavity through a curing port leading to a region of the cavity remote from the injection port. In connection with these embodiments, the invention further provides apparatus for passing ultraviolet light through the curing port to selectively illuminate and thus cure either the resin in the region of that port or the resin in the rest of the cavity.

In other preferred embodiments, the mold includes two portions, one of which is opaque to UV energy and the other of which is transparent to such energy. The opaque portion includes the injection port, and the transparent portion is associated with regions of the cavity remote from the injection port. Introduction of ultraviolet light into the cavity through the transparent portion of the mold causes the resin in the region of that portion to cure before the resin in the region of the injection port.

In connection with each of these embodiments, it is further preferred to provide a portion of the internal surface of the injection port, at the junction of that port with the cavity, with a unidirectional machine finish which breaks up the port into a plurality of thin channels each having a cross-sectional area of between about $15\mu^2$ ($\mu$ = micron) and about $35\mu^2$. The flashings produced by such a port are thin and hair-like and thus can easily be removed from the surface of the recoated fiber.

In accordance with further aspects of the invention, a method for coating a section of an optical waveguide fiber with a resin which shrinks upon curing is provided which comprises the steps of:

(a) placing the section to be coated into a cavity which is connected to an injection port through which the resin can be introduced into the cavity under pressure;

(b) introducing the resin into the cavity through the injection port; and (c) progressively curing the resin in the cavity beginning with the resin in a region remote from the injection port and progressing towards the injection port while introducing additional resin into the cavity under pressure through the injection port to compensate for shrinkage of the resin during curing.

In certain preferred embodiments, the method is used with the completely opaque recoating mold described above to recoat optical waveguide fibers with UV-curable resins. In accordance with these embodiments, the method comprises the steps of:

(a) placing the uncoated section of the fiber into the mold's cavity;

(b) introducing UV-curable resin into the cavity under pressure through the mold's injection port until resin flows out of the curing port;

(c) sealing off the curing port by passing ultraviolet light through that port to illuminate and thus cure the resin in the region of that port;

(d) introducing additional UV-curable resin into the cavity under pressure through the injection port to compensate for the shrinkage of the resin cured in step (c); and (e) passing ultraviolet light through the curing port to illuminate and thus cure the rest of the resin in the cavity while introducing UV-curable resin into the cavity under pressure through the injection port to compensate for shrinkage of the resin during curing.

In other preferred embodiments, the method is used with the partially opaque and partially transparent recoating mold described above. In accordance with these embodiments, the method comprises the steps of:

(a) placing the uncoated section of the fiber into the mold's cavity;

(b) introducing UV-curable resin into the cavity under pressure through the injection port; and (c) introducing ultraviolet light into the cavity through the transparent portion of the mold to progressively cure the resin in the cavity beginning with the resin in the region of the transparent portion and progressing towards the injection port while introducing additional UV-curable resin into the cavity under pressure through the injection port to compensate for shrinkage of the resin during curing.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
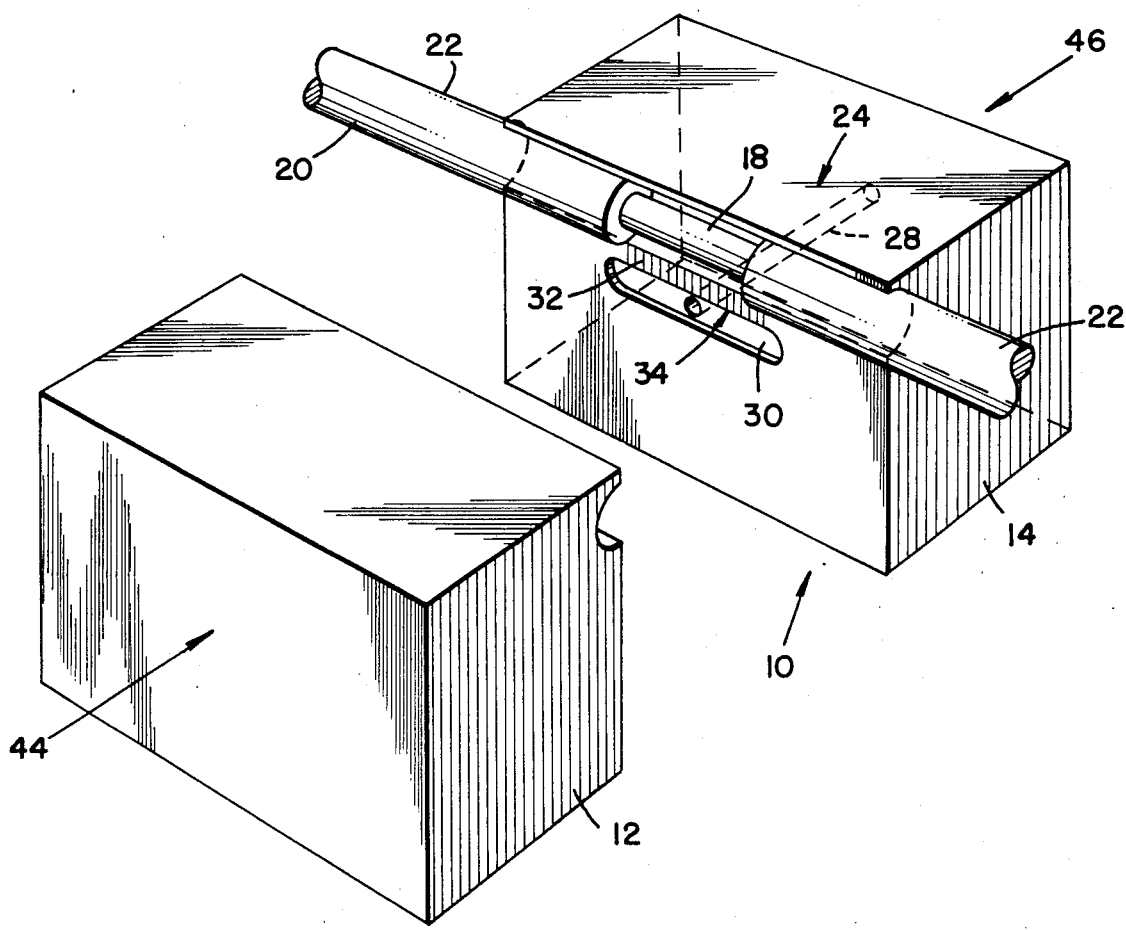
FIGS. 1 and 3 are perspective views of the completely opaque (FIG. 1) and partially opaque/partially transparent (FIG. 3) recoating molds of the present invention in their open condition.

As discussed above, the present invention provides methods and apparatus for recoating optical waveguide fibers so that the cross-sectional size and shape of the recoated section of the fiber matches that of the original fiber. To accomplish this goal, the invention addresses and overcomes the problems of: (1) resin shrinkage during curing; and (2) excessive flashings on the recoated fiber in the region of the mold's injection port.

In the prior art, the shrinkage problem was addressed by making the mold cavity larger than the original fiber in an attempt to compensate for the shrinkage of the resin during curing. Such an approach was only as good as the designer's estimate of the amount of resin shrinkage likely to occur during curing. Since shrinkage varies from resin to resin and also depends upon the specific curing conditions employed, the large cavity approach was at best only an approximate solution to the shrinkage problem.

In contrast to the prior art, the present invention addresses the shrinkage problem by controlling the curing process, rather than by adjusting the size of the mold's cavity. Specifically, the cavity is given a cross-sectional size and shape which is the same as the cross-sectional size and shape of the original fiber.

Curing of the resin is done progressively, beginning with the portions of the cavity remote from the injection port and progressing towards the injection port. For example, for UV-curable resins, this progressive curing is accomplished by placing the injection port along one side of the cavity and introducing UV energy into the mold from the opposite side of the cavity. By controlling the curing process in this way, additional resin can be injected into the cavity as the curing progresses to compensate for the shrinkage of that portion of the resin which has already been cured.

This progressive curing approach represents a significant improvement over the prior art since the success of the approach is not dependent on the specific resin used or the specific curing conditions. The addition of more or less resin into the cavity during the curing process automatically takes account of any variations in these parameters.

In connection with the progressive curing process, it is important to insure that the resin in the injection port does not cure before all the resin in the cavity has been cured. Otherwise, additional resin cannot be introduced into the cavity. As discussed above and as described in more detail below, for UV-curable resins, this is accomplished by forming the injection port in a portion of the mold which is made of a UV-opaque material.

The flashing problem of the prior art is overcome in accordance with the present invention by dividing the mold's injection port, at the junction of that port with the mold's cavity, into a plurality of small channels having cross-sectional areas on the order of a few tens of square microns. In this way, only thin, hair-like flashings are produced in the region of the injection port, and these flashings can be simply wiped off the fiber.

Most preferably, the small channels are formed by applying a unidirectional machine finish to a portion of the internal surface of the injection port at the junction of that port with the mold's cavity. In practice, it has been found that the cross-sectional area of the channels produced by such a machine finish should be kept below about $35\mu^2$ to insure that wiping of the fiber will remove the resulting flashings.

On the other hand, there must be enough channels and the channels must have a large enough cross-sectional area to allow sufficient additional resin to be introduced into the cavity during the progressive curing process to compensate for resin shrinkage. In practice, it has been found that progressive curing using a standard tuberculin syringe to inject the resin into the mold's cavity can be readily accomplished with 35 channels, each having a cross-sectional area of at least about $15\mu^2$.

Referring now to the figures, wherein equivalent structures are identified by the same reference numbers in the various embodiments, there is shown in FIG. 1 a split recoating mold 10 which comprises first and second halves 12 and 14. Each half is made of a material which does not transmit ultraviolet light and preferably both halves are made of the same material. Most preferably, the halves are made of metal, with stainless steel being an especially preferred metal because of its strength and inertness.

Figure 2:
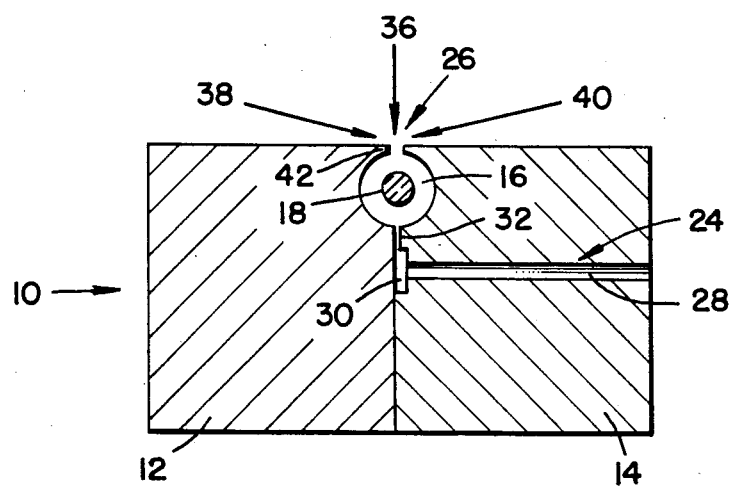
FIGS. 2 and 4 are cross-sectional views of the recoating molds of FIGS. 1 and 3, respectively, in their closed condition taken at the level of the mold's injection port.

As shown most clearly in FIG. 2, mold 10, when closed, forms cavity 16 for receiving the uncoated portion 18 of coated optical waveguide fiber 20. The cross-sectional size and shape of cavity 16 is essentially equal to the cross-sectional size and shape of the original fiber, that is, it has the same size and shape as coated portions 22 of fiber 20. Accordingly, when mold 10 is closed, the walls of cavity 16 and coated portions 22 of fiber 20 are in contact, which prevents overflow of resin onto the coated portions 22 of the fiber during the recoating process.

As can best be seen in FIG. 2, two ports, i.e., injection port 24 and curing port 26, are connected to cavity 16. Port 24 is used to introduce resin, preferably, UV-curable resin, into cavity 16. This port is made up of a primary channel which includes feed tube 28 and reservoir 30 and a plurality of secondary channels 32 which connect the primary channel to the cavity.

Figure 3:
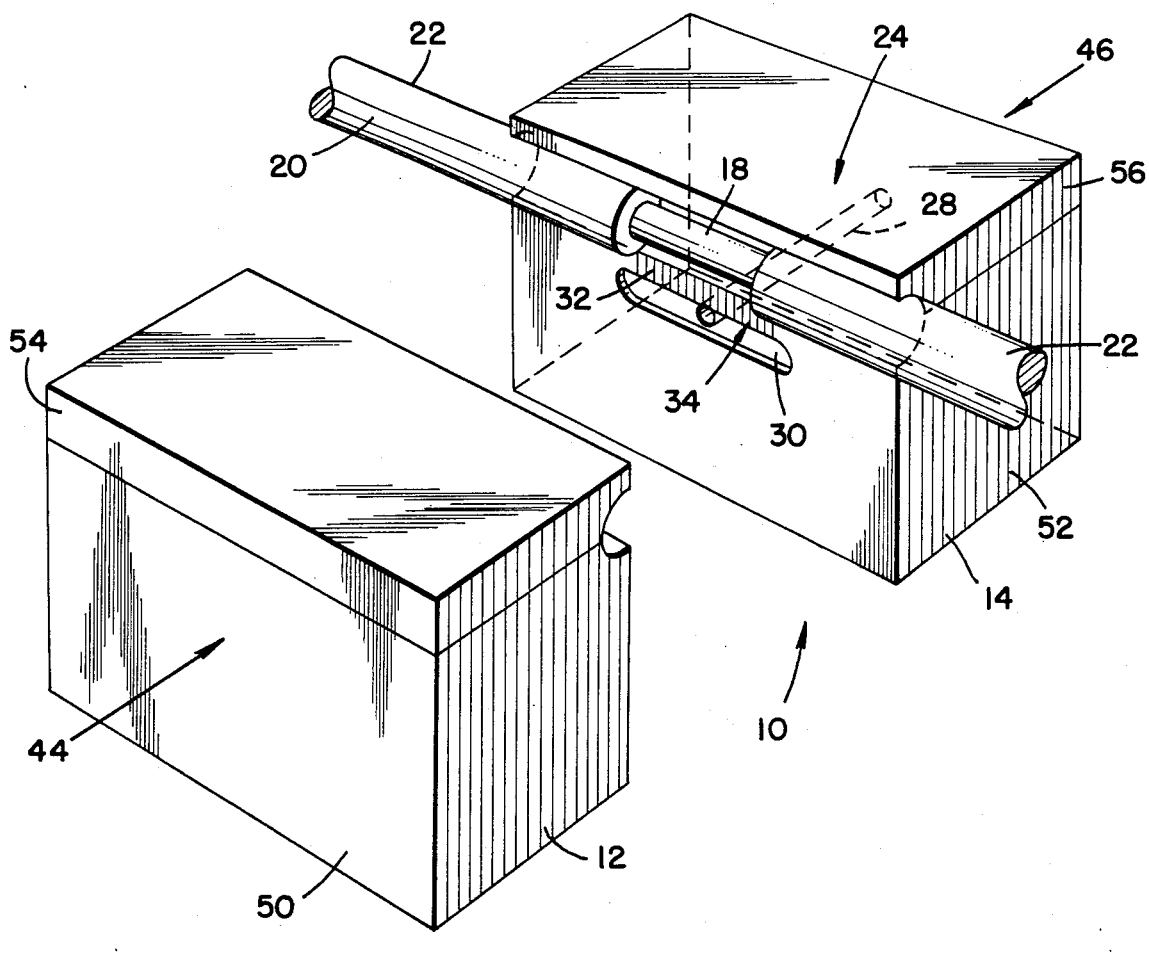

Secondary channels 32 are most conveniently formed by applying a unidirectional machine finish to a portion of the internal surface of injection port 24 at the junction of that port with cavity 16. Such a finish is schematically illustrated in FIGS. 1 and 3 at 34. The mating surface to this unidirectional machine surface carried by portion 12 of mold 10 has a smooth (8 microinch) finish. The resulting secondary channels each have a cross-sectional area of between about 15 and $35\mu^2$, which is significantly smaller than the cross-sectional area of the primary channel which is approximately $9 \times 10^6 \mu^2$ in the area of reservoir 30 and about $4 \times 10^6 \mu^2$ in the area of feed tube 28. By means of these secondary channels, the recoated fiber, rather than having a heavy flashing at the location of the injection port, as was the case with the prior art split recoating molds, has only thin, hair-like flashings at this location which are easily removed from the surface of the fiber.

Curing port 26 allows ultraviolet light to enter cavity 26 to cure the UV-curable resin in the cavity. It also provides a path for air to escape from cavity 16 as the cavity is filled with resin through injection port 24.

As discussed above and in more detail below, in accordance with the method aspects of the invention, the resin in the region of port 26 is cured separately from the resin in the remainder of the cavity. This selective curing is preferably accomplished through the use of multiple UV light sources, shown schematically by arrows 36, 38 and 40 in FIG. 2.

UV light sources 38 and 40 are preferably oriented at an angle of about 15° with respect to the top surface of mold 10 so that they will illuminate and thus cure only the upper portions of cavity 16 in the region of port 26. UV light source 36 is oriented perpendicular to the top surface of mold 10 so that it will illuminate and thus cure the portions of the cavity not cured by light sources 38 and 40.

In use, light sources 38 and 40 are preferably used together so that both halves of the upper portions of cavity 16 are illuminated simultaneously and symmetrically and thus cure simultaneously and symmetrically. Alternately, one light source can be used and switched from one side of the mold to the other. Light source 36 can be a separate light source, as is preferred, or one of light sources 38 or 40 can be moved to the position of arrow 36 when vertical illumination is required. Depending upon the relative lengths of the light sources and the uncoated portion 18, it may be necessary, in some cases, to scan the light sources and the mold relative to one another.

The depth of port 26 is preferably made as small as possible so as to produce a small flashing on the recoated fiber in the region of this port. For a stainless steel mold, it has been found that lip 42 between cavity 16 and the outer surface of the mold can be made as thin as a few microns. Accordingly, the flashing left on the recoated fiber in the region of port 26 has a similar small height.

The recoating mold of FIGS. 1 and 2 is used as follows. First, the uncoated section 18 of fiber 20 is placed in half 14 of mold 10 and centered over injection port 24. Mold half 12 is brought into position as illustrated schematically by arrows 44 and 46 in FIG. 1 and the mold is clamped shut using an appropriate clamping mechanism (not shown).

An appropriate UV-curable resin, which preferably is a similar resin to that used on coated portions 22 of the fiber, is then introduced into cavity 16 under pressure through injection port 24 until resin flows out of cure port 26. A standard tuberculin syringe (not shown) is conveniently used to supply the resin under pressure to feed tube 28.

The pressure on the resin in the cavity is then released, excess resin which has flowed out of port 26 is wiped off of the mold, for example, by use of a straight-edge or squeegee, and port 26 is then sealed off by curing the resin in the region of that port using UV light sources 38 and 40. The wavelength of the UV light sources 38 and 40, as well as light source 36, is chosen to optimize the cure rate of the resin.

Once a sufficiently strong seal has been achieved at port 26, pressure is reapplied to feed tube 28 whereupon additional UV-curable resin flows into cavity 16 to compensate for the shrinkage of the resin which has been cured in the region of port 26. UV light source 36 is then turned on to cure the remainder of the resin in cavity 16, with UV light sources 38 and 40 being either turned off or left on, as desired. To compensate for the shrinkage of the remainder of the resin during curing, pressure is applied to feed tube 28 so that additional resin will flow into the cavity as the resin cures.

Figure 4:
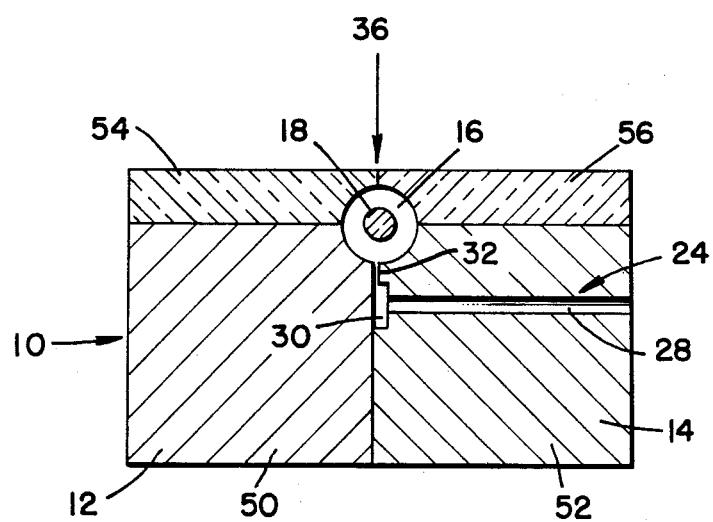

Turning now to the embodiment of FIGS. 3-4, this embodiment is structurally identical to the embodiment of FIGS. 1-2 except that instead of having curing port 26, mold halves 12 and 14 include UV opaque portions 50 and 52 and UV transparent portions 54 and 56.

Most preferably, portions 50 and 52 are made of metal, with stainless steel being most preferred. As is evident from the figures, injection port 24, is formed in the metal (i.e., UV-opaque) portion of the mold so that the resin in the port remains fluid while the resin within cavity 16 is being cured. Portions 54 and 56 are preferably made of glass, a microscope slide being a convenient source for this glass.

The mold is most conveniently formed by bonding the glass and metal portions together and then grinding away an appropriate portion of each half of the mold to form cavity 16. The bonding agent used to attach the glass to the metal should be resistant to any solvents which will be used to clean the mold during use. For example, for the solvent methylene chloride, the epoxy resin Masterbond EP-41s Special, sold by Masterbond, Inc., Teaneck, N.J. 07666, has been found to work successfully.

To allow air to escape from the mold during the filling of cavity 16 with resin, the mating surfaces of mold halves 12 and 14 are provided with an 8 microinch finish. It has been found in practice that this amount of roughness allows air, but not resin, to escape from the mold. The finish is applied to both the glass and metal portions of the mold, including the portions of the mold which define cavity 16. The same finish has been found suitable for use on the mating surfaces of the embodiment of FIGS. 1-2, although in this case air escapes from the mold primarily through curing port 26.

Recoating of fibers with the mold of FIGS. 3-4 involves basically the same steps as those used with the mold of FIGS. 1-2, except that the procedures used to seal off curing port 26 are no longer required, and thus, only one UV light source is used.

Briefly, the uncoated section of the fiber is placed in mold half 14 and centered over injection port 24. Resin is introduced into cavity 16 under pressure using a syringe. The pressure is maintained while UV light source 36 is turned on. The light source progressively cures the resin in the cavity beginning with the resin at the top of the cavity and proceeding downward to the resin at the bottom of the cavity, in the region of the injection port. Throughout the curing process, additional resin enters the cavity through the injection port to compensate for the shrinkage of the resin which has already been cured. Once curing has been completed, UV light source 36 is turned off, the fiber is removed from the mold, and any flashings in the region of injection port 24 are wiped from the fiber.

Without intending to limit it in any manner, the invention will be further illustrated by the following examples wherein optical waveguide fibers are recoated using the molds of FIGS. 1-2 and 3-4.

EXAMPLES

The uncoated regions of spliced optical waveguide fibers were recoated using the molds of FIGS. 1-2 and 3-4. The fibers employed were Corning ® optical waveguide fibers (Corning Glass Works, Corning, New York), having a 125$\mu$ diameter cladding covered with a UV-cured acrylate coating to produce a finished fiber diameter of 250$\mu$. The uncoated sections in the regions of the splices were approximately 8 mm in length.

The UV-curable resin used for the recoating was Desolite Optical Fiber Coating No. 950×200 (DeSoto, Inc., Elgin, Ill.). Resin was introduced into the molds using a hand-operated, 1 cc tuberculin syringe. The molds were cleaned between uses with methylene chloride. As a result, it was found that the recoated fibers could be easily removed from the molds without the need to use a mold release compound.

Curing was done with a UV-2000 ultraviolet light source equipped with a 5 mm diameter liquid light guide (No. 2710) manufactured by Dyonics Corporation (Andover, Mass.). The light intensity was adjusted (reduced) until a curing rate was achieved which resulted in no coating faults due to shrinkage for the syringe pressures, light locations, and curing times employed.

The molds were constructed and used in the manner described above. The mold cavities had a diameter of 250$\mu$, i.e., they had the same diameter as the coated sections of the fiber.

For the mold construction shown in FIGS. 1-2 and for a light source-to-curing port spacing of approximately 1 inch, it was found that 10 seconds per side of 15° curing (6 back and forth passes per side), followed by 15 seconds of vertical curing (10 back and forth passes), was suitable for no fault curing of the recoated section of the fiber. Overall, from initial insertion in the mold to final removal from the mold, the recoating process typically took between about one and one and a half minutes.

The recoating process with the mold construction of FIGS. 3-4 was even quicker. In this case, the overall process took only about 30-45 seconds, of which about 15 seconds were spent curing the resin with the UV light source. The light source-to-mold spacing was again about 1 inch. In this case, it was found that the light source could be held stationary over the center of the recoated portion of the fiber, rather than being moved back and forth, since the glass portion of the mold diffused the UV light so as to cure the resin along the full length of the recoated section of the fiber.

Both the mold of FIGS. 1-2 and the mold of FIGS. 3-4 consistently produced recoated fibers with a minimum of flashings and a diameter in the recoated region which accurately matched the diameter of the original fiber.

What is claimed is:
1. Apparatus for recoating an uncoated section of a coated optical waveguide fiber with a UV-curable resin comprising a split mold which forms, when closed, a cavity for receiving the uncoated section of the fiber, the cross-sectional size and shape of the cavity being essentially equal to the cross-sectional size and shape of the coated fiber so as to prevent resin from flowing onto the coated portions of the fiber adjacent to the section of the fiber to be recoated during the recoating process, said mold including an injection port for introducing UV-curable resin into the cavity under pressure before curing and during the curing process to compensate for resin shrinkage and means for introducing ultraviolet light into the cavity so that resin located in regions of the cavity remote from the injection port will cure prior to resin located in regions of the cavity near the injection port.

2. The apparatus of claim 1 wherein the mold is made of a material which is opaque to ultraviolet light and the introducing means comprises a curing port leading to a region of the cavity remote from the injection port.

3. The apparatus of claim 2 wherein the mold is made of metal.

4. The apparatus of claim 2 further including means for passing ultraviolet light through the curing port to selectively illuminate and thus cure either the resin in the region of that port or the resin in the rest of the cavity.

5. The apparatus of claim 1 wherein the portion of the mold which includes the injection port is made of a material which is opaque to ultraviolet light and wherein the introducing means comprises a portion of the mold which is remote from the injection port and which is made of a material which is transparent to ultraviolet light.

6. The apparatus of claim 5 wherein the material which is opaque to ultraviolet light is metal and the material which is transparent to ultraviolet light is glass.

7. The apparatus of claim 1 wherein the injection port includes a primary channel and a plurality of secondary channels which connect the primary channel to the cavity, each of said secondary channels having a cross-sectional area smaller than the cross-sectional area of the primary channel.

8. The apparatus of claim 7 wherein a portion of the internal surface of the injection port at the junction of that port with the cavity has a unidirectional machine finish and said finish forms the secondary channels which connect the primary channel to the cavity.

9. The apparatus of claim 8 wherein each of the secondary channels has a cross sectional area of between about $15\mu^2$ and about $35\mu^2$.

10. Apparatus for coating an optical waveguide fiber with a resin comprising a mold having a cavity and having an injection port for introducing the resin into the cavity, said port including a primary channel and a plurality of secondary channels which connect the primary channel to the cavity, each of said secondary channels having a cross-sectional area smaller than the cross-sectional area of the primary channel.

11. The apparatus of claim 10 wherein a portion of the internal surface of the port at the junction of the port with the cavity has a unidirectional machine finish and said finish forms the secondary channels which connect the primary channel to the cavity.

12. The apparatus of claim 11 wherein each of the secondary channels has a cross sectional area of between about $15\mu^2$ and about $35\mu^2$.

13. A method for coating a section of an optical waveguide fiber with a resin which shrinks upon curing comprising the steps of:
 (a) placing the section to be coated into a cavity which is connected to an injection port through which the resin can be introduced into the cavity under pressure;
 (b) introducing the resin into the cavity through the injection port; and
 (c) progressively curing the resin in the cavity beginning with the resin in a region remote from the injection port and progressing towards the injection port while introducing additional resin into the cavity under pressure through the injection port to compensate for shrinkage of the resin during curing.

14. A method for recoating an uncoated section of a coated optical waveguide fiber with a UV-curable resin which shrinks upon curing comprising the steps of:
 (a) providing a split mold made of a material which does not transmit ultraviolet light and which forms, when closed, a cavity for receiving the uncoated section of the fiber, the cross-sectional size and shape of the cavity being essentially equal to the cross-sectional size and shape of the coated fiber, said mold including an injection port for introducing the UV-curable resin into the cavity and a curing port for illuminating the cavity with ultraviolet light in order to cure the resin;
 (b) placing the uncoated section of the fiber into the cavity;
 (c) introducing UV-curable resin into the cavity under pressure through the injection port until resin flows out of the curing port;
 (d) sealing off the curing port by passing ultraviolet light through that port to illuminate and thus cure the resin in the region of that port;
 (e) introducing additional UV-curable resin into the cavity under pressure through the injection port to compensate for the shrinkage of the resin cured in step (d); and
 (f) passing ultraviolet light through the curing port to illuminate and thus cure the rest of the resin in the cavity while introducing UV-curable resin into the cavity under pressure through the injection port to compensate for shrinkage of the resin during curing.

15. A method for recoating an uncoated section of a coated optical waveguide fiber with a UV-curable resin which shrinks upon curing comprising the steps of:
 (a) providing a split mold which forms, when closed, a cavity for receiving the uncoated section of the fiber, the cross-sectional size and shape of the cavity being essentially equal to the cross-sectional size and shape of the coated fiber, said mold having a first portion which is made of a material which is opaque to ultraviolet light and which includes an injection port for introducing the UV-curable resin into the cavity, and a second portion for introducing ultraviolet light into the cavity, said second portion being made of a material which is transparent to ultraviolet light;
 (b) placing the uncoated section of the fiber into the cavity;
 (c) introducing UV-curable resin into the cavity under pressure through the injection port; and
 (d) introducing ultraviolet light into the cavity through the second portion of the mold to progressively cure the resin in the cavity beginning with the resin in the region of the second portion and progressing towards the injection port while introducing additional UV-curable resin into the cavity under pressure through the injection port to compensate for shrinkage of the resin during curing.

* * * * *